No. 743,368. PATENTED NOV. 3, 1903.
R. WOERNER.
APPARATUS FOR PRESSING CIGARS.
APPLICATION FILED OCT. 29, 1902.

NO MODEL. 3 SHEETS—SHEET 1.

Witnesses:
Fritz Isler
Paul Murray

Inventor:
Robert Woerner

No. 743,368. PATENTED NOV. 3, 1903.
R. WOERNER.
APPARATUS FOR PRESSING CIGARS.
APPLICATION FILED OCT. 29, 1902.
NO MODEL. 3 SHEETS—SHEET 2.

No. 743,368. PATENTED NOV. 3, 1903.
R. WOERNER.
APPARATUS FOR PRESSING CIGARS.
APPLICATION FILED OCT. 29, 1902.
NO MODEL. 3 SHEETS—SHEET 3.

Witnesses:
Inventor:

No. 743,368. Patented November 3, 1903.

UNITED STATES PATENT OFFICE.

ROBERT WOERNER, OF MANNHEIM, GERMANY.

APPARATUS FOR PRESSING CIGARS.

SPECIFICATION forming part of Letters Patent No. 743,368, dated November 3, 1903.

Application filed October 29, 1902. Serial No. 129,327. (No model.)

*To all whom it may concern:*

Be it known that I, ROBERT WOERNER, manufacturer, a subject of the German Emperor, and a resident of Mannheim, Germany, have invented new and useful Improvements in Apparatus for Pressing Cigars, of which the following is a specification.

This invention relates to an apparatus for pressing cigars, the construction of which is improved in such a manner that an equal and uniform pressure can be exerted on the cigars from all sides.

The improved apparatus offers the great advantage in comparison with other cigar-pressing apparatuses of known constructions that the cigars are ready after a pressure of about two hours, while at present they are ready only after about thirty-six to forty-eight hours.

Figure 1:
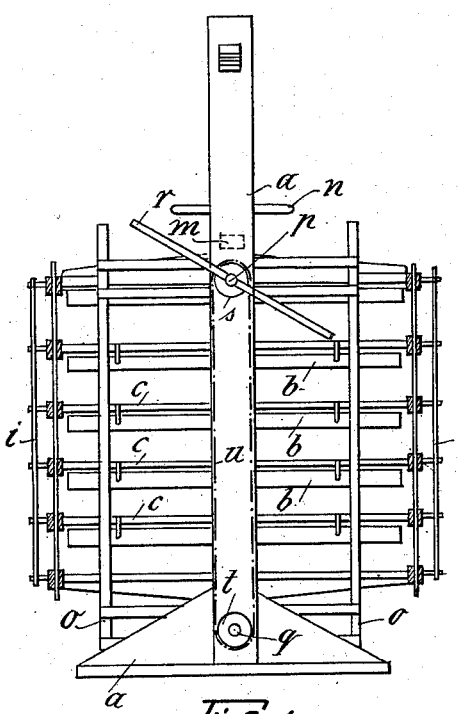
Figure 2:
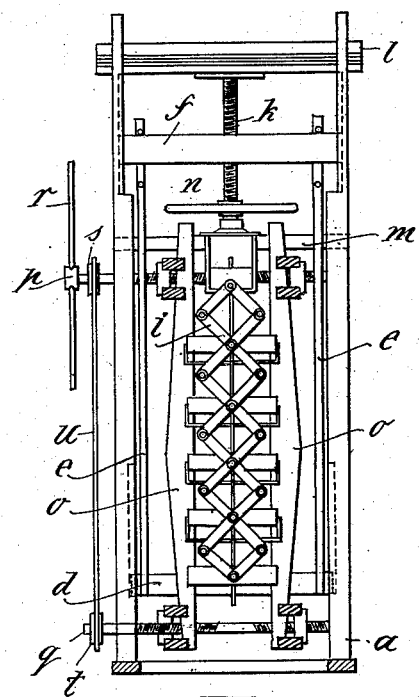
Figure 3:
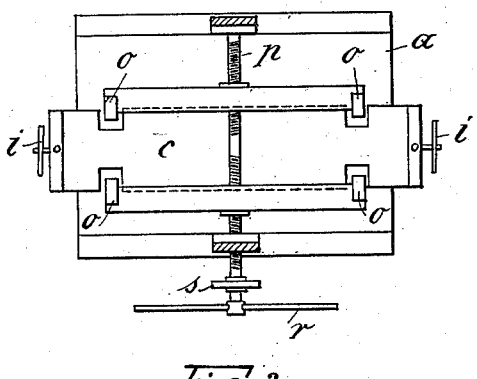
Figure 4:
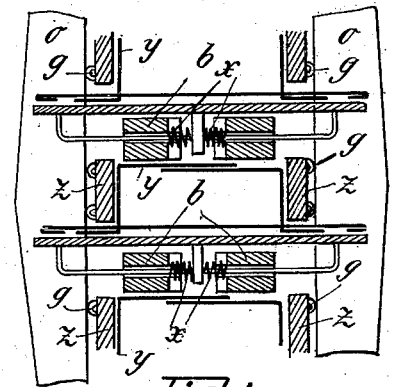
Figure 5:
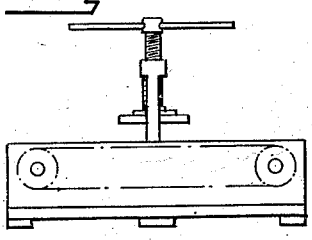
Figure 6:
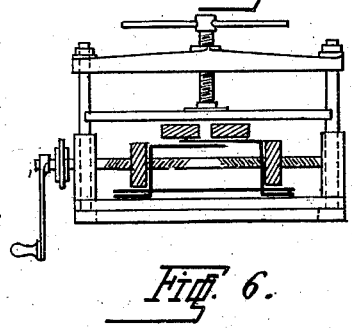
Figure 7:
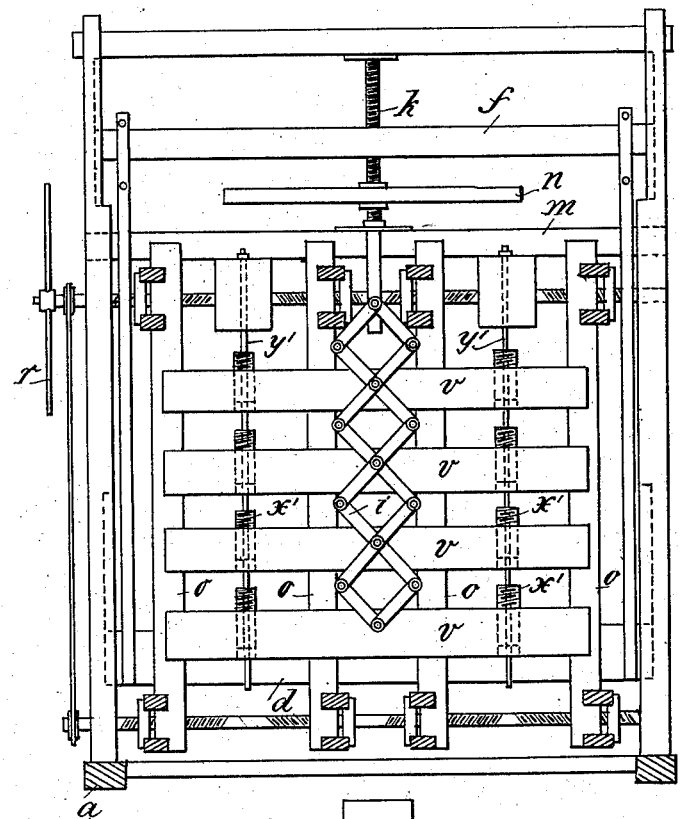
Figure 8:
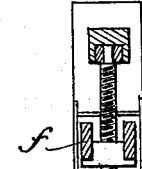
Figure 10:
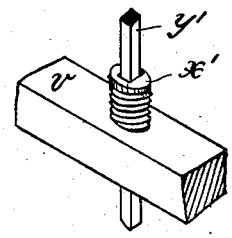
Figure 10:
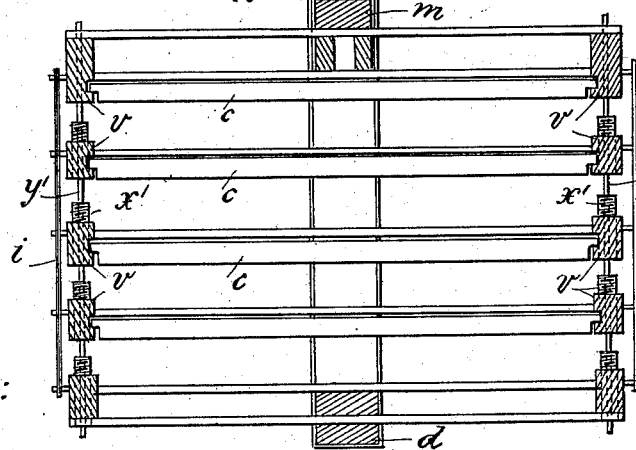
Figure 9:
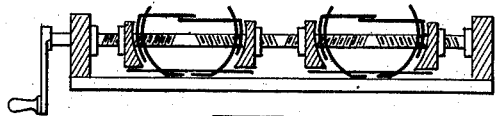
Figure 11:
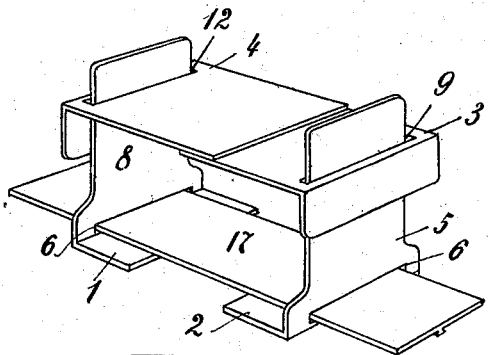
Figure 12:
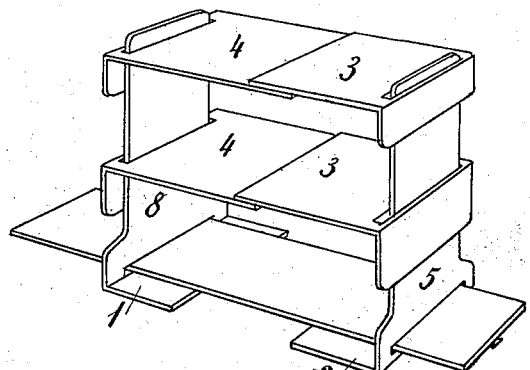
Figure 13:
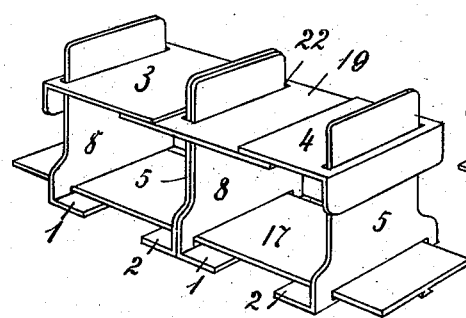
Figure 14:
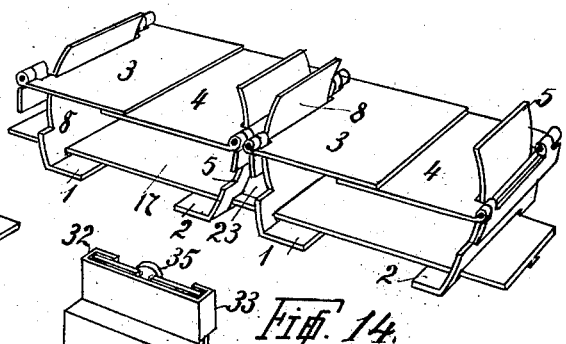
Figure 15:
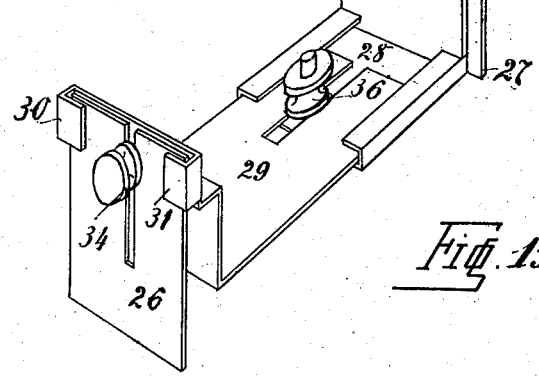

In the accompanying drawings the improved pressing apparatus is shown in Figure 1 in a front view. Fig. 2 is a side view, partly in section. Fig. 3 is a ground plan. Fig. 4 shows the pressing plates and blocks in vertical section on a larger scale. Fig. 5 shows a small apparatus for the pressing of one package of cigars in a side view. Fig. 6 is a vertical section through Fig. 5. Fig. 7 is a side view of a pressing apparatus with two pairs of lateral pressing-bars. Fig. 8 is a longitudinal section through Fig. 7. Fig. 9 is a cross-section through a small pressing apparatus for packing the cigars in bundles. Fig. 10 shows the adjusting device in a perspective view. Fig. 11 shows the inner adjustable pressing device in perspective view. Fig. 12 represents in perspective view an inner adjustable pressing device for the simultaneous pressing of two superposed layers of cigars. Fig. 13 shows in perspective view an inner pressing device to be used for two adjacent packs of cigars. Fig. 14 shows an inner adjustable pressing device to be used for cigars of an extraordinary shape. Fig. 15 is a perspective view of the device for transferring the pressed cigars from the pressing apparatus to the boxes.

The pressing apparatus consists of the fixed main frame $a$, the movable pressure-frame for the vertical pressure, of the movable pressure-frame for the horizontal or lateral pressure, of the pressing-plates and pressing-blocks, and of the inner adjustable pressing devices.

In the fixed main frame $a$ horizontal screw-spindles $p$ $q$ are located, the upper one, $p$, of which is adapted to be rotated by means of a handle-lever $r$. The rotation of the screw-spindle $p$ is transmitted to the lever screw-spindle $q$ by means of toothed wheels $s$ $t$ and chain $u$. On these screw-spindles $p$ $q$, which are provided with right-handed screw-threads at the one end and with left-handed screw-threads at the other end, the bars $o$ for the lateral pressure are movably fixed by means of screw-nuts. There is further located in the main frame $a$ the device for the vertical pressure, which consists of the screw-spindle $k$, supported in the upper cross-beam $l$ and in the fixed cross-beam $m$ of the main frame and adapted to be rotated by means of the hand-wheel $n$. The screw-spindle $k$ passes through the screw-nut of the top cross-beam $f$ of the movable frame for the vertical pressure. The bottom cross-beam $d$ of the movable pressure-frame is connected with the top beam $f$ by the vertical supports $e$ $e$. Between the bottom beam $d$ and the cross-beam $m$ the pressing-plates $c$ and the pressing-blocks $b$ are situated. The pressing-plates $c$, which are larger than the pressing-blocks $b$, are interconnected at both ends by regulating-links $i$. The pressing-blocks $b$ consist of two separate bars, which are supported by brackets fixed to the lower surface of the pressing-plates $c$. (See Fig. 4.) Between the inner sides of each pair of bars forming one pressing-block $c$ spiral springs $x$ are located, which press the bars outward. On each of the pressing-plates $c$ except the uppermost the inner adjustable pressing devices $y$ are placed, the construction of which forms the object of my American patent, No. 694,082, of January 25, 1902. The pressing-blocks $b$ rest on the top of said inner pressing devices $y$ and between the upwardly-projecting ends of the side parts of the same. Side boards $z$, parallel to the pressing-blocks $b$, are inserted between the bars $o$ for the lateral pressure and the sides of the inner pressing devices $y$, which side boards have rollers $g$ at the places where the bars $o$ are situated. This pressing device operates as follows: After the adjustable inner pressing devices $y$, filled with the cigars to be pressed, have been placed in the pressing-plates c the hand-wheel n is rotated, whereby the cross-beam f, and consequently the bottom beam d, of the movable frame are raised, so that on all the pressing-plates c a uniform pressure in vertical direction is exerted by means of the links i, the upper pressing-plate c being prevented from moving by the fixed cross-beam m of the main frame. This pressure is transferred from the pressing-plates to the inner pressing devices y. Simultaneously the handle-bar r is rotated, and the bars o are moved toward each other on the horizontal screw-spindles p q. This movement of the bars o is transferred as lateral or horizontal pressure to the inner adjustable pressing devices y by means of the side boards z.

The apparatus can be modified, as shown in Figs. 7 and 8, in which two pairs of bars o are provided. Consequently the pressing-plates c are larger, and two sets of regulating-links i and accessories are provided.

For limiting the upward movement of the pressing-plates c these plates c may be fixed in high edge boards v, Figs. 7, 8, 10, each of which has a vertically-screw-threaded boring for the reception of an externally-screw-threaded adjusting-piece x', Fig. 10, which has a vertical square central boring through which is passed a vertical rod y' of square section. If this rod y' is rotated in one or the other direction, the adjusting-pieces x' are more or less screwed in or out of the edge boards v, so that the movement of the presssing-plates can be limited as required.

If the apparatus is to be used for pressing one pack of cigars only, it can be constructed as shown in Figs. 5 and 6. In this construction the vertical pressure is exerted on the pressing-blocks directly by the screw-spindle, and the lateral pressure is exerted by lateral pressing-blocks moved to and from the inner pressing device by means of one screw-spindle with right and left handed screw-threads. There are two sets of such lateral pressing-blocks provided, the screw-spindles of which are connected by chain connection.

If the apparatus just described with reference to Figs. 5 and 6 is to be used for pressing cigars to a particular shape, the inner surfaces of the lateral pressing-blocks are curved so as to fit the curved surfaces of the side parts of the inner pressing device.

The adjustable inner pressing devices y are represented in Figs. 11 to 14. The adjustable inner pressing device, as shown in Fig. 11, consists of four plates, 1, 2, 3, and 4, the outer ends of which are bent at right angles upward and downward, respectively. The vertical parts 5 8 of the plates 1 2 have slots 6 directly above the horizontal parts 1 2 for the passage of a bottom plate 17. The upper smaller ends of the vertical parts 8 5 of plates 1 2 project through slots 9 12, which are provided in the horizontal parts 3 4, respectively, near the outer ends of the same. The horizontal bottom part 17 is guided with a feather in a suitable groove on the upper surface of the horizontal plates 1 2.

The inner pressing device (shown in Fig. 12) is destined for the pressing of two superposed layers of cigars, for which purpose the vertical parts 5 8 of the plates 1 2, respectively, are prolonged, so that two of the plates 3 4 can be used.

The inner pressing device constructed as shown in Fig. 13 serves for the pressing of two adjacent packs of cigars, and consists practically of two of the devices shown in Fig. 11 placed together end to end. With this device an intermediate plate 19 is used, which has a slot 22 to be passed over the upper end of the central vertical parts.

The device constructed as shown in Fig. 14 is composed of two single devices y, connected with each other by means of a long bottom plate 17, the vertical shanks 5 8 being curved corresponding to the shape which is to be given to the cigars. The downwardly-bent parts of the upper plates 3 4 are separated from the horizontal parts and connected with the same by hinges. The two parts of this device are connected at the upper end by means of a connecting-piece 23.

In Fig. 15 a device is shown which may be used in connection with the pressing apparatus for transferring the pressed cigars to the boxes. This device consists of two vertical side walls 26 27, movable in folds 30 31 and 32 33, respectively, of the upper parts of the upwardly-bent ends of vertical plates 28 29. The plate 28 is guided in horizontal slots formed by the turned-over edges of the horizontal part of plate 29. Set-screws 34 35 36, passing through slots in the side walls 26 27 and in plate 28, serve for securing the several parts in their position to each other. This transporting device is used as follows: After the plates of the transporting device have been adjusted according to the dimensions of the inner pressing device y the top plates 3 4 of this inner pressing device are removed and the transporting device is inserted. Now the pressing device y is turned upside down, so that the cigars are placed on the bottom of the transporting device, the pressing device is removed, the box placed over the transporting device, which is now turned again upside down and removed from the box.

Having fully described my invention, what I claim, and desire to secure by Letters Patent, is—

1. Improved pressing device for cigars comprising in combination, a fixed main frame, a vertical screw-spindle mounted between two cross-beams at the upper end of said main frame, a tram-wheel for rotating said spindle, a cross-beam movable on said spindle connected by means of vertical connecting-rods with a movable cross-beam at the bottom of the main frame, superposed horizontal pressing-plates resting on said bottom beam, regulating-links at the two sides interconnecting the ends of the pressing-plates, pressing-blocks consisting of two separate parallel rods, brackets on the lower surface of the pressing-plates supporting said pressing-blocks, spiral spring between the two rods forming a pressing-block for pressing the same outward, a horizontal screw-spindle in the upper part and a horizontal screw-spindle in the lower part of the main frame, suitable means for equally rotating said screw-spindles, right-handed screw-threads at one end of the screw-spindles and left-handed screw-threads at the other end of the same, screw-nuts, one at each end of the horizontal screw-spindles, vertical bars connecting two of the nuts on the spindles, loose side bars on the pressing-plates, rollers on the outer surface of these side bars at the places where they touch the vertical bars connecting two screw-nuts, inner pressing devices containing the cigars to be pressed consisting of plates movably connected with each other, substantially as described and shown and for the purpose set forth.

2. Improved pressing device for cigars, comprising in combination, a fixed main frame, a vertical screw-spindle mounted between two cross-beams at the upper end of said main frame, a tram-wheel for rotating said spindle, a cross-beam movable on said spindle connected by means of vertical connecting-rods with a movable cross-beam at the bottom of the main frame, superposed horizontal pressing-plates resting on said bottom beam, regulating-links at the two sides interconnecting the ends of the pressing-plates, pressing-blocks consisting of two separate parallel rods, brackets on the lower surface of the pressing-plates supporting said pressing-blocks, spiral spring between the two rods forming a pressing-block for pressing the same outward, a horizontal screw-spindle in the upper part and a horizontal screw-spindle in the lower part of the main frame, suitable means for equally rotating said screw-spindles, right-handed screw-threads at one end of the screw-spindles and left-handed screw-threads at the other end of the same, screw-nuts, one at each end of the horizontal screw-spindles, vertical bars connecting two of the nuts on the spindles, loose side bars on the pressing-plates, rollers on the outer surface of these side bars at the places where they touch the vertical bars connecting two screw-nuts, inner pressing devices containing the cigars to be pressed consisting of plates movably connected with each other, and high edge boards at the outer ends of the pressing-plates, a vertical screw-threaded boring in each of these edge boards, an externally-screw-threaded adjusting-piece screwed into said boring, a square central boring in said adjusting-piece and a square rod passing through one set of adjusting-pieces for simultaneously raising or lowering the same by the rotation of said square rod, substantially as described and shown and for the purpose set forth.

In testimony whereof I have hereunto set my hand in presence of two subscribing witnesses.

ROBERT WOERNER.

Witnesses:
JACOB ADRIAN,
SIGMUND FÄGER.